(12) United States Patent
Katai et al.

(10) Patent No.: US 7,252,743 B2
(45) Date of Patent: Aug. 7, 2007

(54) METHOD FOR CONCENTRATING SOLUTION

(75) Inventors: Yukihiro Katai, Kanagawa (JP); Tadahiro Tsujimoto, Kanagawa (JP); Misao Takahashi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/371,906

(22) Filed: Mar. 10, 2006

(65) Prior Publication Data

US 2006/0144685 A1    Jul. 6, 2006

Related U.S. Application Data

(62) Division of application No. 10/634,848, filed on Aug. 6, 2003.

(30) Foreign Application Priority Data

Aug. 7, 2002    (JP) .............................. 2002-230362

(51) Int. Cl.
*B01D 3/06*    (2006.01)

(52) U.S. Cl. .................... 202/185.1; 159/2.1; 159/4.06; 159/DIG. 10; 202/189; 202/190; 202/262; 202/205

(58) Field of Classification Search ............. 202/185.1, 202/185.2, 189, 190, 205, 236, 262; 159/2.1, 159/4.06, DIG. 10

See application file for complete search history.

(56) References Cited

U.S. PATENT DOCUMENTS

| | | | | | |
|---|---|---|---|---|---|
| 3,004,899 | A | * | 10/1961 | Hunt et al. | .................. 202/191 |
| 3,004,900 | A | * | 10/1961 | Hunt et al. | .................. 202/191 |
| 3,713,990 | A | * | 1/1973 | Lazet | ....................... 202/185.2 |
| 3,779,871 | A | * | 12/1973 | Brown | ......................... 203/88 |
| 4,383,891 | A | * | 5/1983 | Clavier | ....................... 202/234 |
| 4,414,341 | A | | 11/1983 | Williams | |
| 4,551,198 | A | * | 11/1985 | Wiley | ........................ 159/47.3 |
| 4,744,957 | A | * | 5/1988 | Imai et al. | .................. 422/138 |
| 4,950,363 | A | * | 8/1990 | Silvey | .......................... 203/40 |

* cited by examiner

*Primary Examiner*—Virginia Manoharan
(74) *Attorney, Agent, or Firm*—Sughrue Mion, PLLC (57)    ABSTRACT

An low concentration dope is fed through a nozzle into a concentrating apparatus, and flash evaporation of the low concentration dope is performed at an end of the nozzle. The low concentration dope is concentrated thereby to an concentrating dope which is contained and heated in the concentrating apparatus. Thus part of solvents of the low concentration dope and the concentrating dope is evaporated to a solvent gas. The solvent gas is cooled and condensed in a condensing section of the concentrating apparatus, and thereafter drawn through a first exit from the concentrating apparatus. The concentrating dope is concentrated to a high concentration dope, which is drawn through a second exit from the concentrating apparatus.

3 Claims, 6 Drawing Sheets

METHOD FOR CONCENTRATING SOLUTION

This is a divisional of application Ser. No. 10/634,848 filed Aug. 6, 2003. The entire disclosure of the prior application, application Ser. No. 10/634,848 is hereby incorporated by reference.

BACKGROUND OF THE INVENTION

1. Field of the Invention

The present invention relates to a method for concentrating a solution, and more especially a method for concentrating a solution or a polymer dispersion solution which is used for producing an optical film provided in an optical product.

2. Description Related to the Prior Art

In order to produce a polymer film, such as a cellulose acylate film and the like, polymers are dissolved in a solvent to prepare a low concentration dope, namely, a polymer solution or a polymer dispersion solution having low concentration. The low concentration dope has lower concentration than a high concentration dope which is used for forming a polymer film. After preparation, the low concentration dope is often concentrated to the high concentration dope. The high concentration dope is used for forming the polymer film in a method for producing the polymer film to obtain it. Thus, the time for dissolving the solute becomes shorter, and it is prevented that the undissolved material remains in the low concentration dope. As a method of concentrating the low concentration dope, there are methods of flash evaporation and a thin film evaporation. In the method of flash evaporation, especially of spray flash evaporation disclosed in U.S. Pat. No. 4,414,341, the heated low concentration dope is fed out from a nozzle ("orifice") in a tank, and thereby forms tiny droplets such that the total size of surfaces of the tiny droplets becomes larger. Accordingly, the solvent in the low concentration dope can be easily evaporated.

Figure 7:
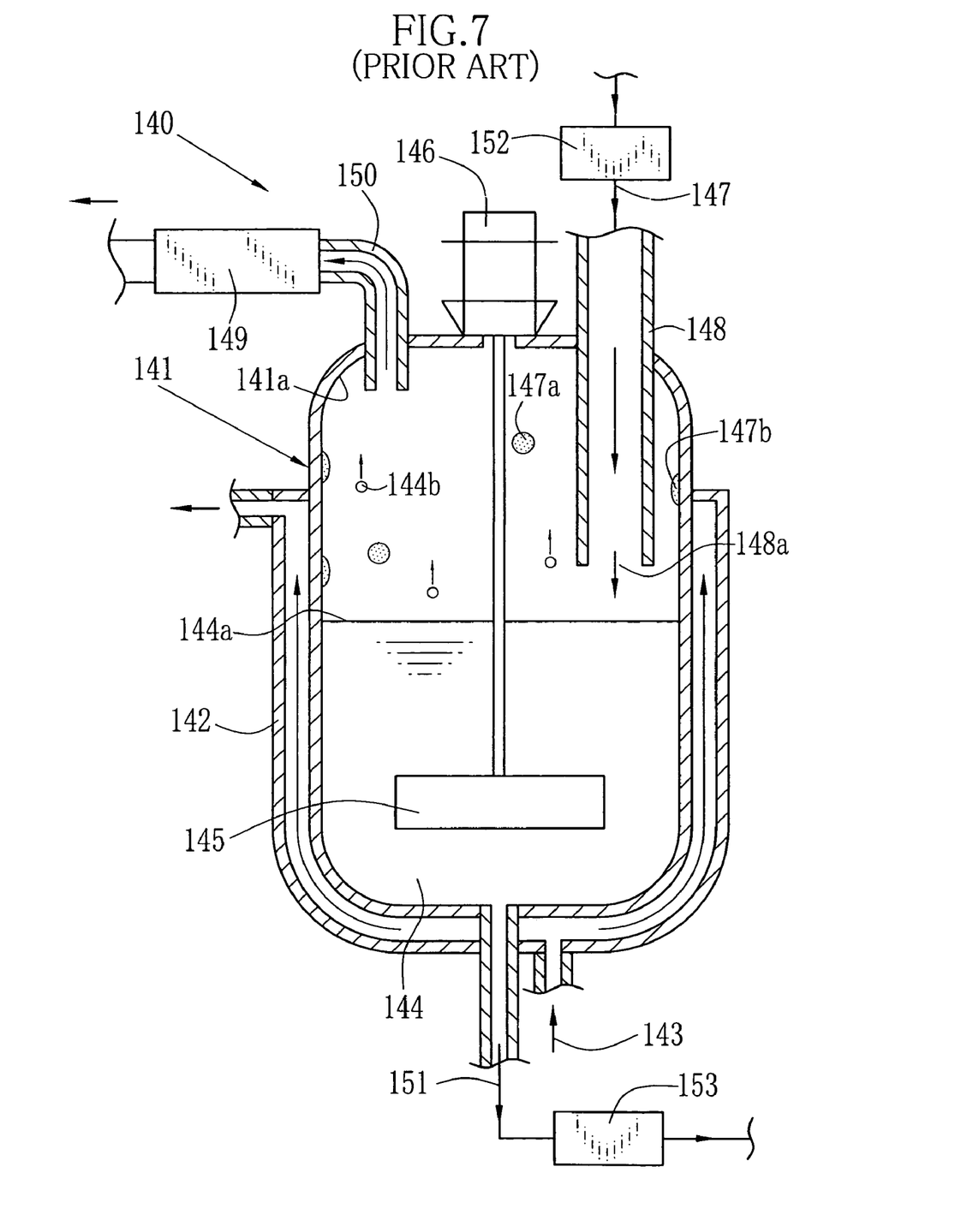
FIG. 7 is a sectional view of a concentrating apparatus of the prior art.

As shown in FIG. 7, in a method of the spray flash evaporation in the prior art, for example, a concentrating apparatus 140 is used. The concentrating apparatus includes a tank main body 141 and a jacket 142 for controlling a temperature of the tank main body 141, and a medium 143 flows in a space between the tank main body 141 and the jacket 142. In an upper side, the tank main body 141 has a nozzle 148 for performing a flash evaporation of a low concentration dope 147 which has been filtrated with a filtration apparatus 152. An end 148a of the nozzle 148 is positioned over a surface 144a of a concentrating dope 144, which is obtained from the low concentration dope 147 through flash evaporation and contained in the tank main body 141. In the tank main body 141, there is a stirrer 145 for stirring the concentrating dope 144. The stirrer 145 is connected with a motor 146 and controlled a rotation thereof. Further, a condenser 149 is connected through a pipe 150 to the tank main body 141. In the tank main body 141, a solvent of the concentrating dope 144 is evaporated to become a gas solvent 144b, and the gas solvent 144b is condensed with the condenser 149. Thereby, the concentrating dope 144 is concentrated to a high concentration dope 151, and the high concentration dope 151 is fed out and filtrated with a filtration apparatus 153 to use for forming the polymer film.

However, when the low concentration dope 147 is fed out from the nozzle 148, tiny droplets 147a of the low concentration dope 147 are sprayed, and some of the tiny droplets 147a are adhered on an inner wall 141a of the tank main body 141 to generate a skinning 147b, easily. The skinning 147b varies the composition of the high concentration dope 151 and pollutes the inside of the tank main body 141. The skinning 147b is removed from the high concentration dope 151 by the filtration apparatus 153, and when the filtration apparatus 153 is stopped with the skinning, the filtration apparatus 153 is exchanged for another one. In this case, time for exchange of the high concentration dope 151 is necessary, and flow rate varies, which prevents to continuously obtain the high concentration dope 151 having a uniform concentration. Further, a little of the high concentration dope 151 remains in the removed filtration apparatus 153 at exchange. Furthermore, the removed filtration apparatus 151 is cleansed with solvent. Accordingly, cost therefore cannot be reduced.

Further, in order to prevent the concentrating dope 144 from drying, a temperature of the inner wall 141a is lower than the boiling point of the concentrating dope 144. However, in the method of flash evaporation in the prior art, when the temperature of the inner wall 141a is lower than the boiling point, the solvent gas 144b is condensed on the inner surface 141a, and the condensate is often mixed with the concentrating dope 144. Thus the concentrating dope 144 is diluted, and the efficiency of concentrating the low concentration dope 147 becomes lower. Further, in order to evaporate the solvent uniformly, the concentrating apparatus 140 must have such a large space (whose capacity is from 200L to 10000L) that the dope surface 144a is enough large and the tiny droplets 147a are hardly adhered to the inner wall 141a, while the stirrer 145 stirs the concentrating dope 144. Therefore it is hard to secure a space for setting the concentrating apparatus 140. Furthermore, as the capacity of the concentrating apparatus 144 is large, the concentrating dope 144 remains in the tank main body 145 for from one to four hours. Accordingly, the high concentration dope 151 is sometimes denaturated.

Furthermore, as the low concentration dope is sprayed in a gas phase, gas is dissolved therein, and the concentrating dope 144 contains a larger amount of gas. When the high concentration dope perpared from such concentrating dope 144 is cast dried on a band, gas is generated, which prevents the formation of a polymer film having a smooth surface. Accordingly, degassing from the high concentration dope is necessary before use for forming the polymer film.

SUMMARY OF THE INVENTION

An object of the present invention is to provide a method for concentrating a solution, in which generation of skinning is prevented.

In order to achieve the object and the other objects, in a method for concentrating a solution of the present invention, a solvent gas is generated from the solvent of the solution fed in a concentrating apparatus to concentrate the solution. The solvent gas is condensed in the concentrating apparatus and recovered as a condensed solvent.

The concentrating tank includes a tank main body for containing the solution and concentrating the solution and a roof disposed on said tank main body. An inclined inner surface of the roof forms a condensing surface for condensing the solvent gas.

A gutter is attached near a lower end of the roof to the tank main body so as to receive the condensed solvent flowing downwards on the condensing surface. The temperature of the inner surface of the roof is lower than that of the solution in the tank main body.

A draining pipe is attached to a bottom of the tank main body for draining the concentrated solution from the concentrating tank. The concentrating tank includes at least one flash nozzle, and the flash nozzle is disposed under a solution surface of the solution in the concentrating tank so as to discharge a fresh solution into the solution.

Further, in the method of the present invention, a height of the solution surface of the solution in the tank main body is preserved constant. The time that the solution stays in the concentrating tank is from 0.5 minute to 20 minutes.

In the present invention, the solution is previously filtrated with a filtration apparatus. The concentrated solution drained from the concentrating tank is filtrated with a secondary filtration apparatus. A differential rate Rv of the filtration is calculated from a following formula:

$$Rv(\%)=\{(V1-V2)/V1\}\times 100$$

wherein V1 is mass of a solute removed in filtration with an unit size of the primary filtration apparatus before a first filtration pressure during the solution flowing in the primary filtration apparatus becomes to the first predetermined value, and V2 is mass of the solute removed in filtration with a unit size of the secondary filtration apparatus before a second filtration pressure during the concentrated solution flowing in the secondary filtration apparatus becomes to a second predetermined value.

In the present invention, the solute contains polymer. A polymer concentration of the polymer in the high concentration solution is from 12 wt. % to 40 wt. %.

In the present invention, a concentration tank for the concentrating a polymer solution includes a tank main body and a roof disposed on the tank main body. In the tank main body, the polymer solution is temporary contained while it is concentrated. The roof has an inclined inner surface which forms a condensing surface for a solvent gas evaporated from the polymer solution. At least one flash nozzle is inserted to the tank main body. The flash nozzle is disposed under a solution surface of the polymer solution in the tank main body, and discharges a supplied fresh polymer solution into the polymer solution which is concentrated in the tank main body. A draining pipe is connected to a bottom of the tank main body for draining a concentrated polymer solution.

In the concentration tank, an end of the flash nozzle is bent to have an L-shape towards the bottom of the tank main body. The roof has a cone-like shape, and the tank main body has a bowl-like shape.

According to the method for concentrating the low concentration solution of the invention, as the solvent gas generated from the solvent in the low concentration solution is condensed in the concentrating apparatus, the generation of the skinning is prevented, and the efficiency of concentrating the low concentration solution becomes larger. Further, in the concentrating apparatus of the present invention, the efficiency of concentrating the low concentration solution is large. Accordingly, the size of the concentrating apparatus is one hundredth smaller than that of the prior art. Further, as the flash evaporation is made in the concentrating solution, degassing can be easily made.

In the present invention, the low concentration solution is concentrated to the high concentration solution. When polymer is dissolved as the solute, the high concentration solution adequate for forming the polymer film is easily obtained. Especially, when TAC is used as the polymer, and when the methyl acetate is used as the solvent, then the effect of the present invention is large. Further, in the method for concentrating the low concentration solution, the time for concentrating is shorter than in the prior art. Accordingly, a life of the secondary filtration apparatus for the high concentration solution becomes longer, and therefore, a time for exchanging the secondary filtration apparatus becomes shorter.

In the present invention, as the generation of the skinning is prevented, the polymer film formed of the high concentration solution is excellent in surface conditions and the optical characteristics. Further, when the polymer film is used as the protective film in the polarizing filter, the optical characteristics of the protective film or the polarizing filter is excellent.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Polymers, additives and solvents used for a dope are explained at first. Thereafter, a method of producing a dope of high polymer concentration will be explained, in which a method for concentrating a dope of the present invention is included. Then explanations for a method of forming a polymer film from the dope of high polymer concentration, the formed polymer film, and optical products in which the polymer film is used will follow. Further, as a solute, there are also monomers or oligomers which cannot be dissolved in the solvent so much. In this case, thereafter the monomers or the oligomers are used to obtain the low concentration dope, which is concentrated to the high concentration dope in the same method of the present invention.

[Polymers]

The polymers used in the present invention are not restricted, when they can be dissolved to one or more adequate organic or inorganic solvents to obtain the dope for producing the film. As such polymers, there are cellulose esters, polycarbonate, polyurethane, polyvinyl alcohol based resin, polyacrylonitryl, polyamide resin such as aromatic polyamide and the like, aromatic polyimide, polyesteramide, polyamide imide, polyacrylic resin, polymetacrylic resin, polyester resin, cellulose based polymer, silicone resin, fluorocarbon resin, and the like. Cellulose esters are preferable in these polymers. In the cellulose esters, cellulose acylate is particularly preferable, and cellulose acetates are especially preferable. In the cellulose acetates, cellulose triacetate (TAC) is most especially preferable, whose averaged acetylic degree is in the range of 57.5% to 62.5%, when the percent acetyl value is measured in ASTM:D-817-91 (testing method for cellulose acylate and the like). The acetyl value means a degree in mass of acetic acid combined with cellulose polymer. In an embodiment of the present invention, the cellulose acylate particles may be used. At least 90 wt. % of the cellulose acylate particles have diameter in the range of 0.1 mm to 4 mm, preferably in the range of 1 mm to 4 mm. Further, it is preferable that the ratio of the cellulose acylate particles having diameter in the range of 0.1 to 4 mm is preferably at least 95 wt. % of the cellulose acylate particles, particularly at least 97 wt. %, especially at least 98 wt. %, and most especially at least 99 wt. %. Furthermore, it is preferable that at least 50 wt. % of the cellulose acylate particles have diameter in the range of 2 mm to 3 mm. The ratio of the cellulose acylate particles having diameter in the range of 2 mm to 3 mm is particularly at least 70 wt. %, especially at least 80 wt. %, and most especially at least 90 wt. %. Preferably, the cellulose acylate particle has a nearly ball-like shape.

[Additives]

As additives used in the present invention, there are plasticizers and ultraviolet absorbing agents (ultraviolet stabilizer). As the plasticizers, for example, there are phosphoric acid esters (for example, triphenyl phosphate (herein after TPP), tricresylphosphate, cresyldiphenyl phosphate, octyldiphenyl phosphate, biphenyldiphenyl phosphate (hereinafter DBP), trioctyl phosphate, tributyl phosphate and the like), phthalic acid esters (for example, diethyl phthalate, dimethoxyethyl phthalate, dimethyl phthalate, dioctyl phthalate, and the like), grycolic acid esters (for example, triacetin, tributyrin, butylphthalylbutyl grycolate, ethylphthalylethyl grycolate (or ethylphthalylgrycol ethylesters), methylphthalylethyl grycolate, butylphthalylbutyl grycolate, and the like), acetates (dipentaerythritol hexaacetate, ditrimethylolpropane tetraacetate and the like).

As the ultraviolet absorbing agent, there are, for example, oxybenzophenone based compounds, benzotriazol based compound, salicylates based compounds, benzophenone based compounds, cyanoacrylate based compounds, nickel complex salt based compounds, and the like. Especially preferable are benzotriasol based compounds and benzophenone based compounds. Further, the dope may contain several type of additives, such as mold lubricant, peeling agent, fluorine based surfactant. Further, one of the above additives or a mixture of the several sorts of the above additives may be used in the present invention. The additives may be added before or after preparation of the low concentration dope.

[Solvent]

As the solvent used in the present invention, there are, for example, hydrocarbon halides, esters, ketones, ethers, and alcohols. In the hydrocarbone halide, there are, for example, dichloromethane, chlorofolm and the like. In the esters, there are, for example, methyl acetate, methyl formate, ethylacetate, amylacetate, butylacetate and the like. In ketones, there are, for example, acetone, methylethylketone, cyclopentanone, cyclohexanone and the like. In ethers, there are, for example, dioxane, dioxolane, tetrahydrofrane, diethylether, methyl-t-butylether, and the like. In alcohol, there are, for example, methanol and ethanol. Especially preferable are dichloromethane, methyl acetate, methyl formate, acetone, cyclopentanone, cyclohexanone, dioxolane. It is preferable to dehydrate the solvent before use. Note that the sorts of the solvents are not restricted in them, and the number of carbons is until 6 in cases of esters, ketones, ethers, and alcohols. One of the above solvents or a mixture of the several sorts of the above solvents may be used in the present invention. The solvent in the present invention is not restricted in the above described. The purification of the solvents may be that in the market. In view of circumstance maintenance, it is preferable to use methyl acetate as the solvent.

[Method Of Producing Dope]

Figure 1:
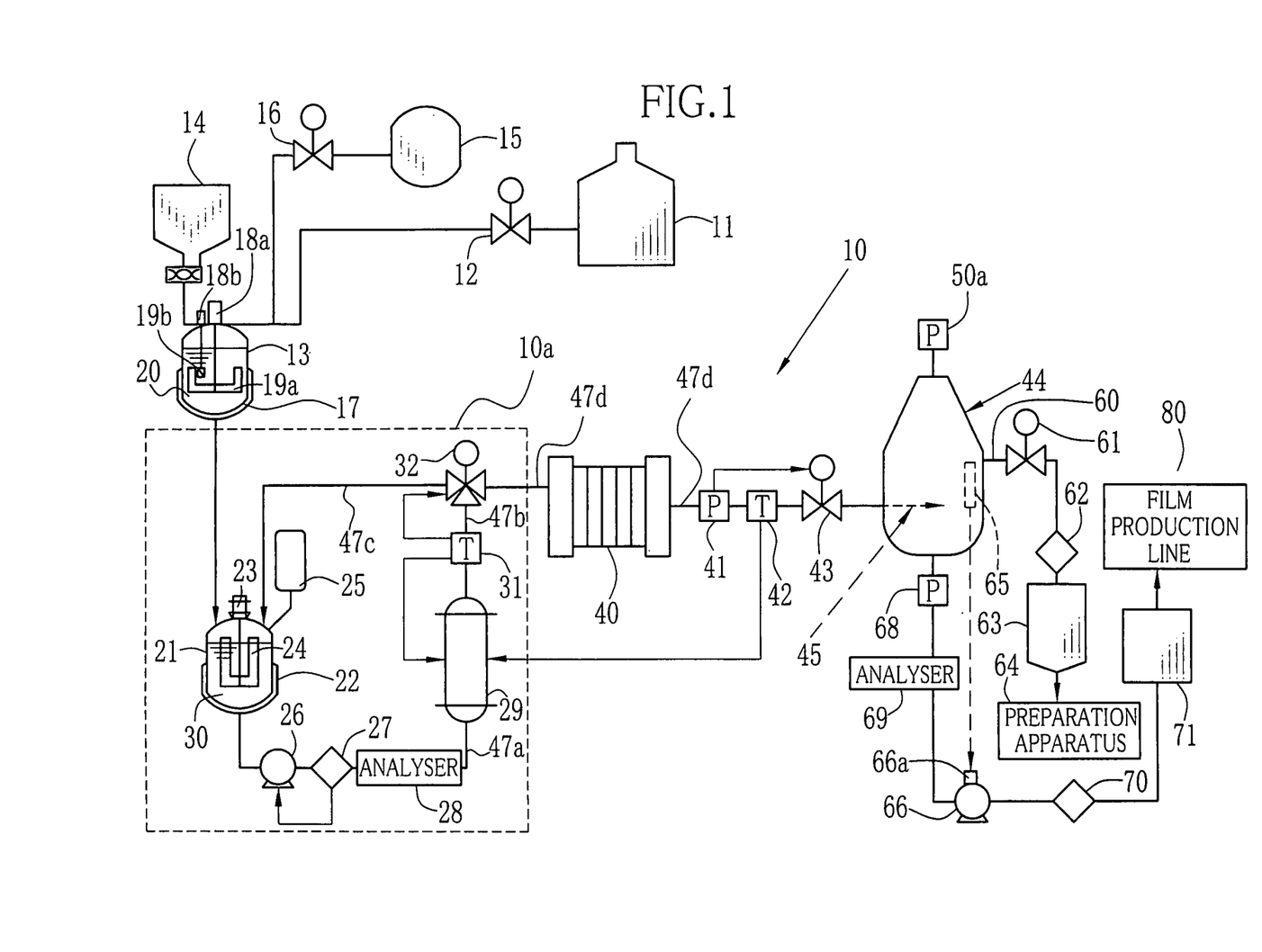
FIG. 1 is a schematic diagram of a producing line used for a method of producing a high concentration dope of the present invention.

In FIG. 1, the TAC, the additives and the solvents are respectively supplied in a measuring hopper 14, an additive tank 15 and a solvent tank 11 in a dope production line 10. At first, a valve 12 is opened that the solvent is fed from the solvent tank 11 to a dissolution tank 13. Then the TAC is fed from the measuring hopper 14 to the dissolution tank 13 with being measured.

Thereafter, a valve 16 is opened such that the necessary amount of the additives is fed from the additive tank 15 to the dissolution tank 13. Note that there are several methods for feeding the additives. When the additives are liquid in a room temperature, they can be fed in a liquid state. When the additives are solid, they can be fed with a measuring hopper to the dissolution tank 13. Further, when the plural additives are added, they are mixed in the one additive tank, or they are fed from the respective additive tanks independently through pipes into the dissolution tank 13.

In the above embodiment, the solvent, the TAC and the additives are fed in this order. However, the feeding order is not restricted in it. For example, the TAC may be previously measured and fed before the solvent. Further, the additives are not added into the dissolution tank 13, but added in following processes.

A lower side of the dissolution tank 13 is covered with a jacket 17, and there is a space between the dissolution tank and the jacket 17. In the space, a heat transfer medium is fed for adjusting temperature of the solvent in the dissolution tank 13. Further, the dissolution tank 13 is equipped with a stirrer 19a and an eccentric stirrer 19b of dissolver type. The stirrer 19a is driven by a motor 18a, and the eccentric stirrer 19b is driven by a motor 18b. When the stirrer 19a rotates, then the mixture of the solvent, the TAC, the additives are mixed to dissolve the TAC to the solvent. Thus a dispersion solution 20 is obtained. In the dispersion solution 20, the solute may be swollen.

The dispersion solution 20 is fed to a preparation tank 21 in an adjusting section 10a, and when a predetermined amount of the dispersion solution 20 is contained in the preparation tank 21, then the feeding of the dispersion solution 20 stops. The adjusting section 10a is constructed of the preparation tank 21, a heater 29, a selector valve (two-way valve) 32 which are cyclically combined through passages 47a-47c formed in pipes (not shown). The preparation tank 21 includes a jacket 22, a motor 23 and a stirrer 24, and a condenser 25. A pump 26 drives to feed in the passage 47a the dispersion solution 20 through a flow meter 27 and an analyzer 28. Then the dispersion solution 20 reaches the heater 29. In the heater 29, the dispersion solution 20 is heated such that the dissolution of the polymer to the solvents may proceed, and becomes a low concentration polymer solution (hereinafter, a low concentration dope) 30. The low concentration dope 30 is fed in the passage 47b through a thermometer 31, to reach the selector valve 32. The selector valve 32 is provided for selecting one of the passages 47c and 47d such that the low concentration dope 30 flows in it. The selector valve 32 is previously set so as to feed the low concentration dope 30 into the passage 47c.

While the low concentration dope 30 circulates in the adjusting section 10a, the low concentration dope 30 is heated. Part of the solvent becomes gas in the preparing tank 21. The gas is fed through pipes to the condenser 25 from the preparation tank 21, liquidized and fed back to the preparation tank 21. The preferable flow rate of the dispersion solution 20 is determined on the basis of flow data obtained by the flow meter 27. In the present invention, it is preferable to use a near infrared spectral analyzer as the analyzer 28 so as to obtain a composition ratio in the low concentration dope 30. However, another analyzer may be used, for example, a measuring apparatus for measuring a transmitting speed of supersonic wave so as to obtain a composition of the low concentration dope 30. Preferably, a multi-pipe heat exchanger including a static mixer (not shown) is used as the heater 29. In this case, the temperature of the low concentration dope 30 is adjusted in the heater 29 on the basis of data obtained by the thermometer 31. Note that the low concentration dope 30 has a polymer concentration of from 5 wt. to 30 wt. %, and a temperature of from 50° C. to 180° C. At 30° C., the low concentration dope 30 has viscosity of from 0.1 Pa·s to 100 Pa·s, and the dissolved gas content is in the range of 10 mg/L to 500 mg/L. However, conditions of the low concentration dope 30 are not restricted in them.

When the temperature measured by the thermometer 31 becomes the predetermined value, then the selector valve 32 is set to feed the low concentration dope 30 in the passage 47d toward the concentrating apparatus 44. While being fed in the passage 47d, the low concentration dope 30 leaves the adjusting section 10a and passes through a primary filtration apparatus 40, a pressure gauge 41, a thermometer 42, a pressure adjusting valve 43 and a flash nozzle 45, sequentially. Then flash evaporation of the low concentration dope 30 is performed at a forward end of the flash nozzle 45 so as to obtain a high concentration dope 67 (see FIG. 2). During flash evaporation, the pressure adjusting valve 43 opens and closes on the basis of data obtained by the pressure gauge 41, so as to keep flash pressure of the low concentration dope 30 for flash evaporation constant. Preferably, the flash pressure is from saturated vapor pressure to 5 MPa higher than the saturated vapor pressure, at a flash temperature which is determined as the temperature of the low concentration dope 30 for flash evaporation.

Figure 2:
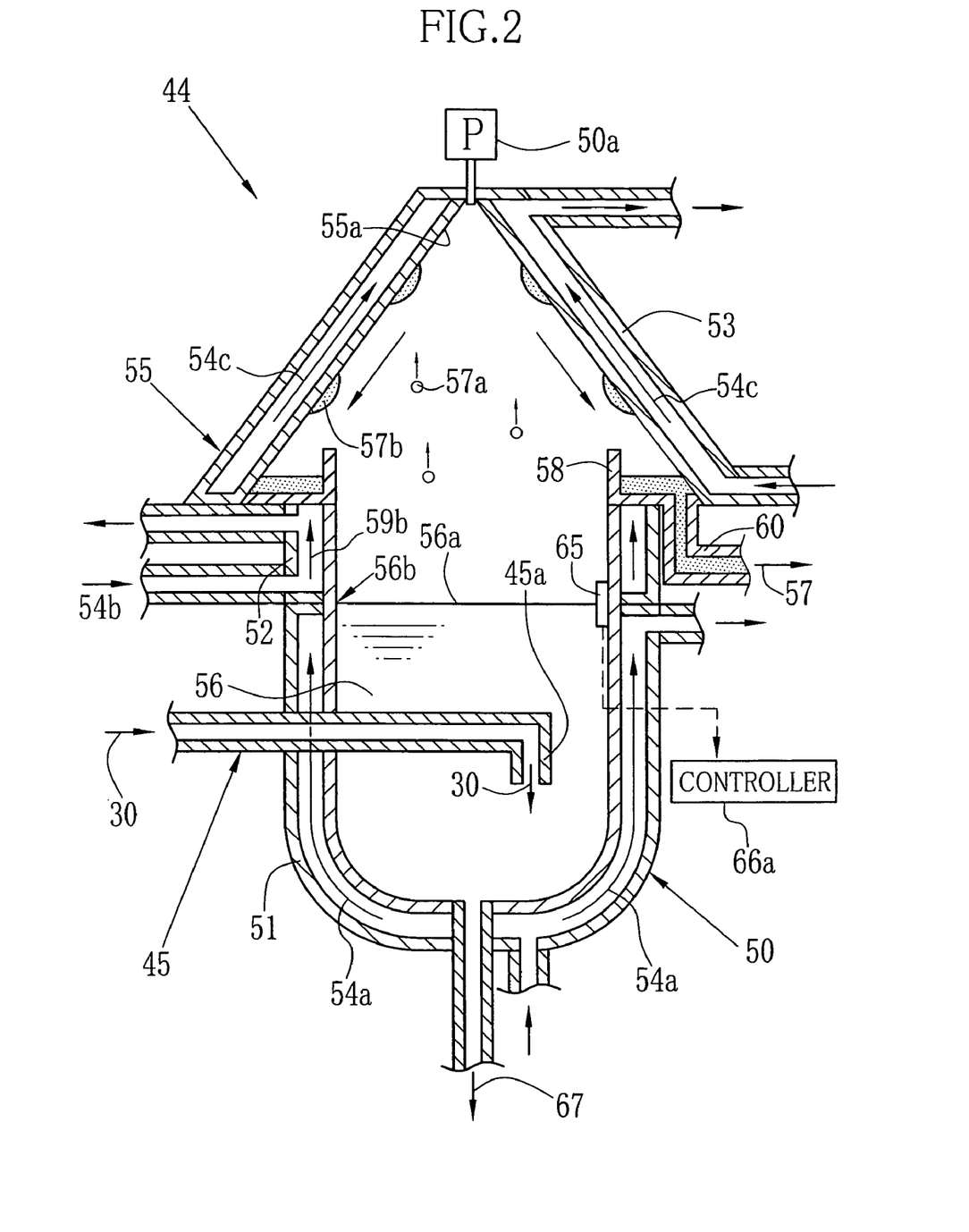
FIG. 2 is a sectional view of a concentrating apparatus used for concentrating a low concentration dope.

In the concentrating apparatus 44, while the low concentration dope 30 becomes the high concentration dope 67, a solvent gas 57a (see, FIG. 2) is violently generated from part of the low concentration dope 30, and thereafter condensed to a condensed solvent 57b (see FIG. 2). The condensed solvent 57b is drawn through an adjusting valve 61 and a flow meter 62 into a recovery solvent tank 63. Then the condensed solvent 57b is transported to a preparation apparatus 64 and reused after preparation as the solvent for dissolving the polymer.

The high concentration dope 67 is fed out from the concentrating apparatus 44 by a pump 66. The flow rate thereby is controlled by a controller 66a attached to the pump 66. Further, the analyzer 69 is a near infrared ray processing analyzer for analyzing the composition of the high concentration dope 67. When the composition is predetermined one, the high concentration dope 67 is fed through a flow meter 70 and a secondary filtration apparatus 71, and used in a film production line 80. Note that the analyzer 69 is not restricted in the near infrared ray processing analyzer, and may be, for example, a measuring apparatus for measuring a transmitting speed of supersonic wave.

Note that the dope production line 10 may be batch type or continuous type. Further, the viscosity of the low concentration dope is preferably low, such as in the range of 0.1 Pa·s to 100 Pa·s at 30° C. In this case, the low concentration dope is smoothly fed the dope production line 10.

[Method for Concentrating Dope]

As shown in FIG. 2, the concentrating apparatus 44 includes a tank having a tank main body 50 and a condensation roof 55. The tank main body 50 is provided with a first jacket 51 and a second jacket 52, and a flash portion of the tank main body 50 is covered with the first jacket 51. The condensation roof 55 is provided with a third jacket 53. Inside of each of the first-third jackets 51-53, there is a space in which each heat transfer mediums 54a-54 is supplied. Thus the temperatures of the tank main body 50 and the condensation roof 55 are adjusted independently. The heat transfer mediums 54a, 54b of the first and second jackets 51, 52 are used for heating the tank main body 55, and the adjusting medium 59c of the third jacket 53 is used for cooling the condensation roof 55. Note that the tank main body 55 and the condensation roof 55 are separately formed, and combined with each other to form the concentrating apparatus 44. Otherwise, the tank main body 55 and the condensation roof 55 may be integrally formed.

When the low concentration dope 30 is fed into the tank main body 50 through the flash nozzle 45, then part of the solvent evaporates and the low concentration dope 30 becomes a concentrating dope 56 in the tank main body 50. The concentrating dope 56 is contained in the flash portion of the tank main body 50, and a height of the flash nozzle 45 is adjusted such that an exit 45a of the flash nozzle 45 is disposed under a dope surface (or gas-liquid boundary surface) 56a. Note that the position and the formation of the flash nozzle 45 are not restricted in the illustration. When the flash pressure is controlled in the range of saturated vapor pressure of the solvent at the flash temperature to 5 MPa higher than the saturated vapor pressure, the generation of the skinning is prevented and concentrating dope 67 is effectively concentrated. If the flash pressure is less than the saturated vapor pressure, then the solvent is evaporated, and the skinning is sometimes generated. In this case, as the boiling point of the low concentration dope 30 becomes lower, the low concentration dope 30 cannot have thermal energy enough for the flash evaporation. Accordingly, effect of concentrating the low concentration dope 30 becomes smaller. Further, if the flash pressure is above 5 MPa higher than the saturated vapor pressure, the tank main body 50 must have endurance against the flash pressure that is more than necessary, which causes cost to be hardly reduced. However, the present invention is not restricted in the above range.

A solvent gas 57a of the solvent is generated in flash evaporation and condensed on a condensing surface 55a of the condensation roof 55 to obtain a condensed solvent 57b. The condensed solvent 57b has a the form of a drop or extends on the condensing surface 55a due to the effect of the surface tension of the condensing surface 55a. As the condensing surface 55a is inclined, the condensed solvent 57b flows downwards in effects of gravity (and surface tension thereof). Thus the condensed solvent 57b is received by a gutter 58, and thereafter flows out from the condensing apparatus 44. Further, a pressure gauge 50a is attached to the tank main body 50 to measure the inside pressure thereof. The amount of the low concentration dope 30 for flash evaporation and the temperatures of the flash section and the condensation roof 55 are controlled on the basis of data obtained by the pressure gauge 50a. Note that the condensation surface 55*a* is made of materials, such as SUS 316, SUS 316L, Hastelloy (trade name), in order to have an adequate surface tension. Further, it is preferable that grooves are formed on the condensing surface 55*a* to extend in a direction in which the condensed solvent 57*b* flows to the gutter 58. In this case, as the effect of surface tension of the condensing surface becomes larger, the recovered condensed solvent 57 hardly falls into the flash section. The number and the shape of the grooves can be determined optionally.

Note that it is preferable that the absolute pressure of a gas in the condensation roof 55 is from 500 hPa to 1100 hPa. In this case, bubbles are effectively generated in the concentrating dope 56. Accordingly, part of the solvent is easily separated from the concentrating dope 56. Further, height of the liquid surface 56*a* is detected with a liquid surface sensor 65, and data obtained by the liquid surface sensor 65 is sent to a controller 66*a* to use for controlling the flow rate of the high concentration dope 67.

The volume of the tank main body 50 is determined in accordance with flow rate of the concentrating dope 56 such that the residence time of the concentrating dope 56 is in range of 0.5-20 minutes. Further, volume of gas, or gas holdup, in the tank main body 50 is in range 10%-60%, while the gas holdup is determined in the following formula:

$$\{(Vg-VL)/Vg\} \times 100(\%)$$

wherein Vg is a total volume of gas and solution, and VL is volume of solution. When the above formula is satisfied, the solvent gas 57*a* is effectively liquidized. Further, the size of the concentrating apparatus 44 is not so large to keep the space for the concentrating apparatus 44. Further, as the residence time is 0.5-20 minutes, denaturation of the high concentration dope 67 is prevented. Note that the concentrating apparatus 44 is not restricted in the above description.

At an edge 56*b* of the dope surface 56*a*, skinning (not shown) can be easily generated. In order to prevent the generation of the skinning, the temperatures in the spaces of the first and second jackets 51, 52 are independently controlled. The temperature of the heat transfer medium 54*a* in the space of the first jacket 51 is controlled so as to easily perform the evaporation of the concentrating dope 56. Temperature of the heat transfer medium 54*b* in the space of the second jacket 52 is controlled so as to prevent the gas-liquid equilibrium of the concentrating dope 56 in the tank main body 50. Thus, when the concentrating dope 56 contacts to the inner surface of the tank main body 50 upwards from the dope surface 56*a*, the skinning is hardly generated. Note that when the plural solvents are used, the above conditions are set in accordance with the lowest one of the temperatures on gas-liquid equilibrium.

As the temperatures of the heat transfer mediums 54*a*-54*c* are adjusted independently, three parts of the tank main body 50 are regulated to the respectively predetermined temperature. Therefore the concentration of the low concentration dope 30 can be effectively made. Concurrently, a standard temperature of the heat transfer medium is set in the range of 20° C. to 70° C. in space of the first jacket 51, of 10° C. to 60° C. in the space of the second jacket 52, and in the range of −10° C. to 20° C. in the space of the third jacket 53. When the temperature of each heat transfer medium 54*a*-54*c* is constant with fluctuation in a temperature range of −1° C. to +1° C. from the standard temperature, the condition of polymer concentration can be regulated. Further, the temperature of the tank main body 50 is controlled three parts. However, the control of the temperature can be made in two or four and more parts.

The high concentration dope 67 has a polymer concentration from 12 wt. % to 40 wt. %, and a temperature of from 20° C. to 60° C. At 30° C., the high concentration dope 67 has viscosity of from 1 Pa·s to 200 Pa·s, and dissolved gas content of 1 mg/L to 200 mg/L. Further, when a difference of polymer concentration between the low concentration dope 30 and the high concentration dope 67 is in range of 1 wt. % to 15 wt. %, the quality of the high concentration dope 67 hardly becomes worse. However, conditions of the high concentration dope 67 are not restricted in them.

In FIGS. 1 and 2, each primary and secondary filtration apparatus 40, 71 is provided with a pressure gauge (not shown). The pressure gauges measure first and second filtration pressures P1 and P2, respectively. In each primary and secondary filtration apparatus 40 and 71, a first predetermined filtration pressure PL and a second predetermined filtration pressure PH are respectively set in range of 0.5 MPa to 2.0 MPa and in range of 0.5 MPa to 3.0 MPa. While the first filtration pressure P1 becomes a first predetermined filtration pressure PL, mass of solute in the low concentration dope 30 in the primary filtration apparatus 40 is determined as a first amount V1 of solute removed from the low concentration dope 30 with a unit size of the primary filtration apparatus. While the second filtration pressure P2 becomes a second predetermined filtration pressure PH, mass of solute in the high concentration dope 67 in the secondary filtration apparatus 71 is determined as a second amount V2 of solute removed from the high concentration dope 76. The differential rate Rv of the filtration amount between the primary and secondary filtration apparatus is represented in the following formula:

$$Rv(\%)=\{(V1-V2)/V1\} \times 100$$

Preferably, the differential rate Rv of the filtration amount is at most 50%. Concurrently, flow rate of the low concentration dope 30 is set in range of 60 kg/hr to 1200 kg/hr, and flow rate of the high concentration dope 67 is set in range of 59 kg/hr to 1190 kg/hr. Preferably, the first amount V1 of solute through the primary filtration apparatus 40 is from 100 kg/m$^2$ to 20000 kg/m$^2$, and the second amount V2 of solute through the filtration apparatus 71 is from 60 kg/m$^2$ to 20000 kg/m$^2$. Note that the filtration apparatuses are not restricted in the above description.

Figure 3:
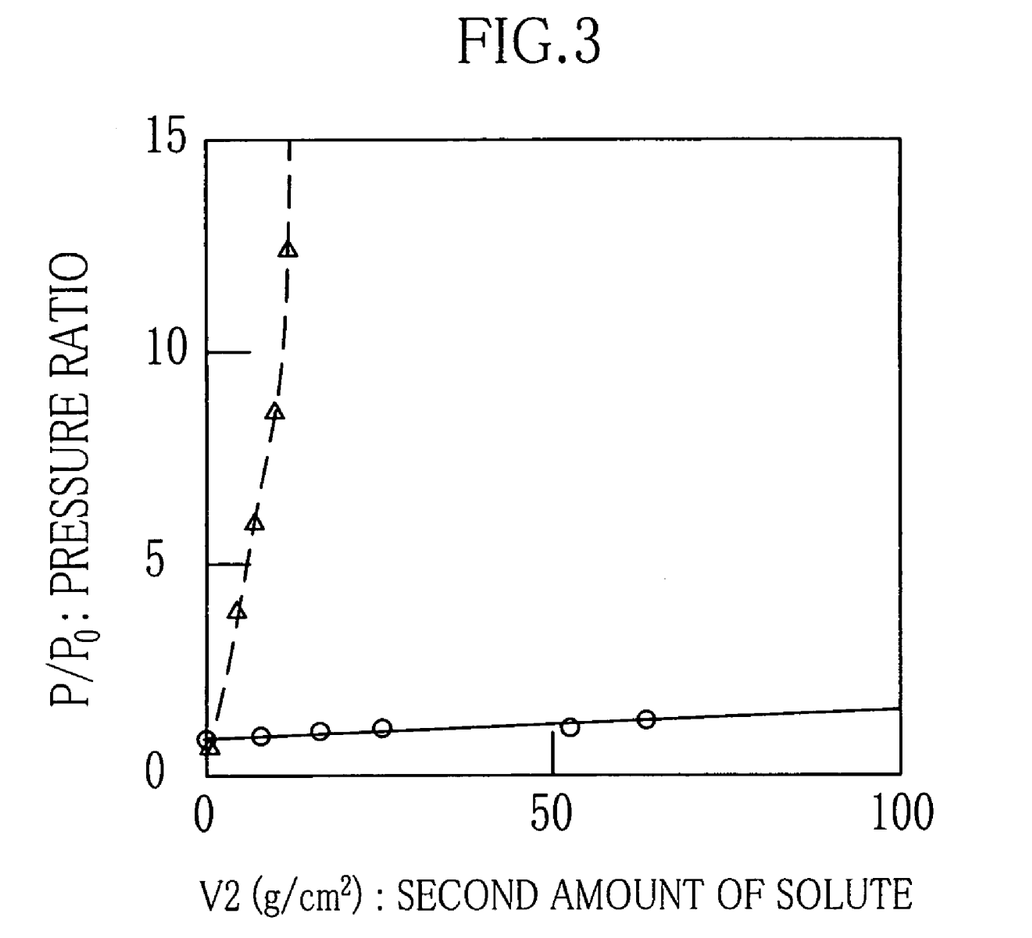
FIG. 3 is a graph illustrating a relation between pressure and amount of solute removed with a unit size of the filtration apparatus.

The generation of the skinning is prevented by adjusting the flow rates of the low concentration dope 30 and the high concentration dope 67 and the first and second filtration pressure P1, P2, independently. When the skinning is generated, the pressure of the high concentration dope 67 for filtration varies. In FIG. 3, axis of abscissia represents the second amount V2 (g/cm$^2$) of solute in the high concentration dope 67 through the secondary filtration apparatus 71, and the axis of ordinate represents a pressure ratio (P2/Pi), a ratio of the second filtration pressure P2 to an initial pressure Pi, of the secondary filtration apparatus 71. When the low concentration dope 30 is concentrated in a method of the present invention, then the obtained data of the pressure ratio (P2/Pi) of the secondary filtration apparatus 71 are marked with circles, and the circles are combined with a line. When the low concentration dope is concentrated with a concentrating apparatus 140 of FIG. 7 in the method of the prior art, then the obtained data of the pressure ratio (P2/Pi) of a filtration apparatus 153 are marked with triangles, and the triangles are combined with a dotted line. As shown in FIG. 3, as the generation of the skinning is prevented in the concentrating apparatus 44, the ratio (P2/Pi) does not change suddenly. However, in the method of the prior art, a large amount of the skinning is generated in the concentrating apparatus 140 and mixed with the high concentration dope. Accordingly, the filtration apparatus 153 is stopped by skinning, and the ratio (P2/Pi) becomes larger suddenly.

As the generation of the skinning is prevented in the present invention, effect of the present invention is especially large in the combination of the solvent and the solute for easily generation of the skinning, namely for low solubility. For example, the TAC is used as polymer, and the methyl acetate is used as the main solvent although the solubility of the methyl acetate to the TAC is very low. In this case, the effect of the present invention is especially large.

[Method Of Forming Polymer Film from Dope]

Figure 4:
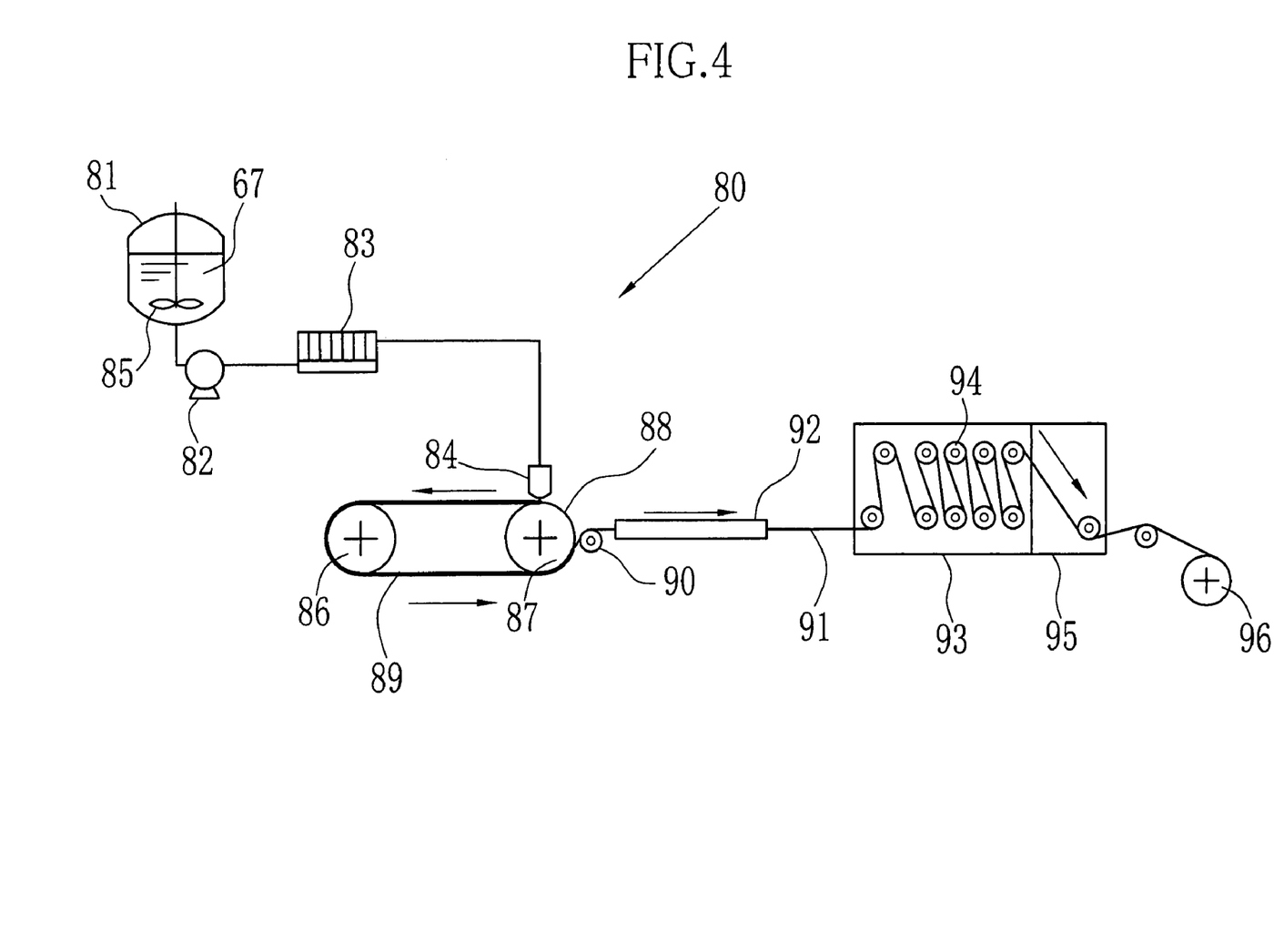
FIG. 4 is a schematic diagram of a film production line for producing a polymer film from the high concentration dope of high polymer concentration.

As shown in FIG. 4, the high concentration dope 67 is used for forming a polymer film 91 in a film production line 80. The high concentration dope 67 is contained in a dope tank 81. The dope tank 81 is connected with a casting die 84 through a pump 82 and a filtration apparatus 83. The dope tank 81 is provided with a stirrer 85 which a motor (not shown) drives to rotate for the always uniform concentration of the high concentration dope 67. Thereby, the additives, such as the plasticizers and the ultraviolet absorbing agent and the like, can be mixed to the high concentration dope 67.

A band 88 is disposed below the casting die 84 and supported with rollers 86, 87. The rollers 86, 87 are rotated by a driver (not shown) such that the band 88 moves in an arrowed direction. When the pump 82 is driven, then the high concentration dope 67 is fed to the filtration apparatus 83 in which impurities and the like are removed from the high concentration dope 67. Thereafter, the high concentration dope 67 is fed to the casting die 84, and is cast from the casting die 84 on the band 88. The high concentration dope 67 becomes gel-like film at first, and thereafter dried on the band 88 to have self-supporting property. Thus the high concentration dope 67 forms the polymer film 91, and a peel roller 111 peeled from the band 88.

The content of the solute in the high concentration dope 67 is smaller than in the low concentration dope 30, and the viscosity of the high concentration dope 67 is in the range of 1 Pa·s to 200 Pa·s higher than the low concentration dope 30. Accordingly, the time for drying on the base becomes shorter and the gel like film can have faster the self-supporting property. Thus the cost for producing the polymer film is reduced, and the size of the apparatuses for the film production line becomes smaller.

The polymer film 91 is transported to a tension frame or a tenter 92, in which the hot air is blown to dry the transported polymer film 91. In this case, the polymer film 91 was stretched at least in a widthwise direction to have a predetermined width. In this embodiment, the high concentration dope 67 is cast on the continuous band 88. However, the method of producing a polymer film is not restricted in it, and the high concentration dope 67 may be cast on a rotary drum.

Then, the polymer film 91 is fed from the tenter 92 to a drying chamber 93, and dried further with guide of rollers 94 in the drying chamber 93. Thereafter, the polymer film 91 is cooled in a cooling chamber 95, and rolled up by a winding apparatus 96. Note that when the polymer film 91 is fed out from the cooling chamber 95, the side edges thereof may be cut off and the knurling may be performed.

Figure 5:
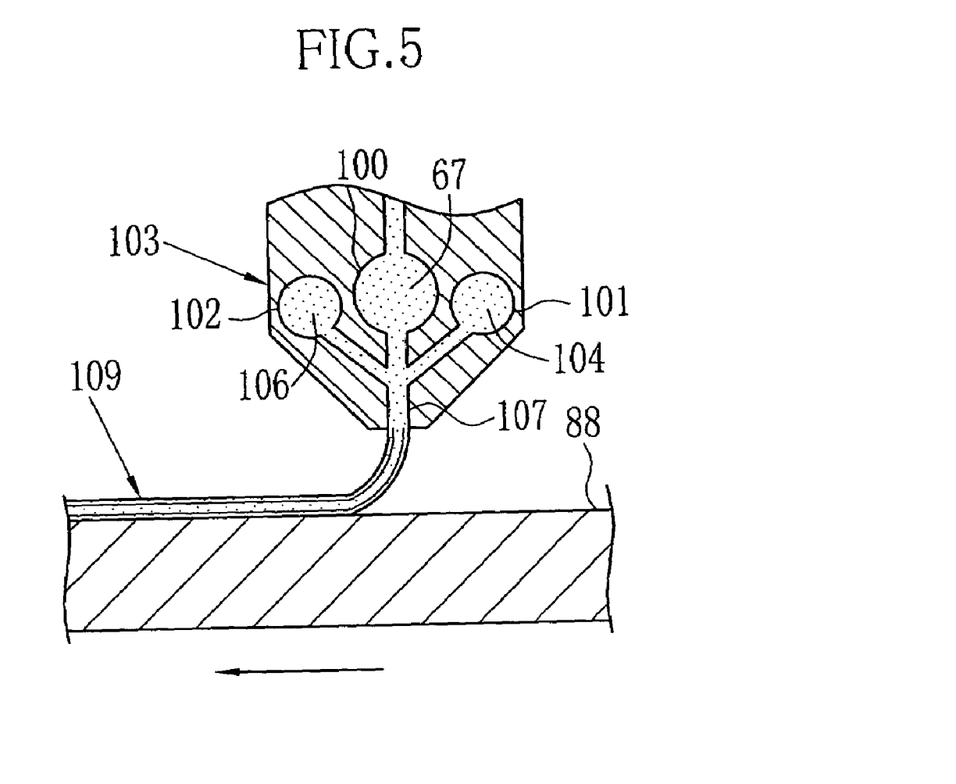
FIG. 5 is a sectional view of a first embodiment of a casting die used in the film manufacturing line in FIG. 4.

In the above embodiment, the number of the high concentration dopes cast on the band is one. However, the number is not restricted to one. For example, in FIG. 5, a casting die 103 is a multi-manifold casting die having plural manifolds 100, 101, 102 that can be supplied with the high concentration dope 67 and other sorts of two dopes 104, 106 through feed pipes (not shown). The dopes 67, 104, 106 are joined downstream from the manifolds 100-102 and cast on the band 88 to be a gel-like film 89 having a three-layer structure. After drying the high concentration dope 67 and the dopes 104, 106, a polymer film (not shown) is obtained. Note that the casting die is not restricted in this description in the method for forming the polymer film. For example, a feed block in which the plural dopes are joined may be provided upstream from the casting die to cast several sorts of the dopes on the band 88 at the same time.

Figure 6:
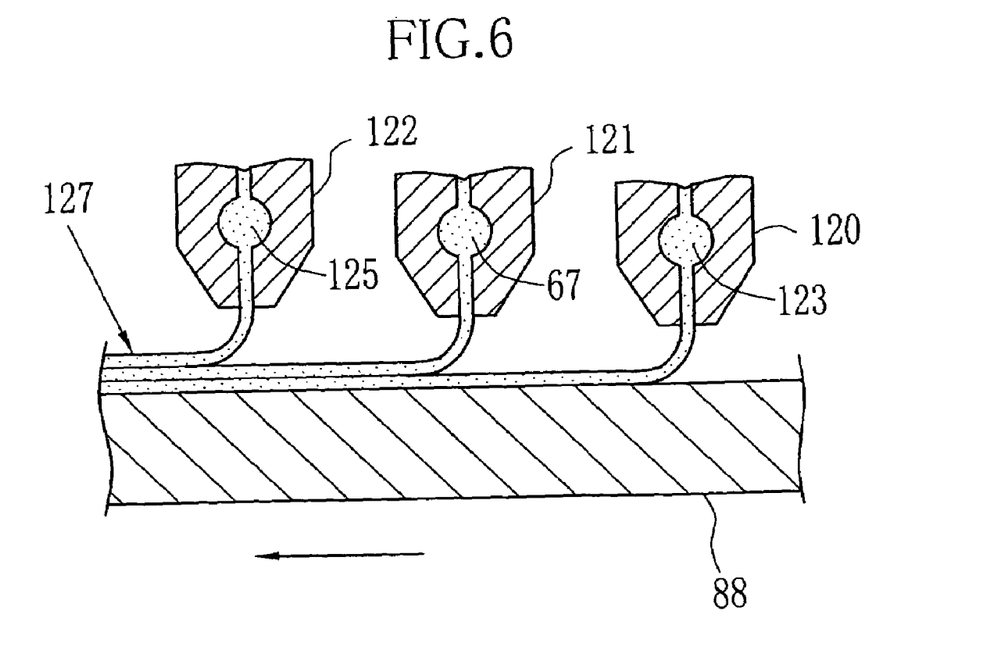
FIG. 6 is a sectional view of a second embodiment of a casting die used in the film manufacturing line in FIG. 4.

In FIG. 6, three casting dies 120, 121, 122 of single manifold type are arranged above the band 126. The casting dies 120, 122, 121 are respectively supplied with dopes 123, 125 and the high concentration dope 67 through feed pipes (not shown). The dope 123, the high concentration dope 67 and the dope 125 are cast on the band 109 sequentially, and dried to form a polymer film. Note that the number of the casting dies is not restricted in the above description, and may be, for example, two, four, and the like. Note that the method of the producing the polymer film is not restricted in the above embodiment. Furthermore, the casting dies of single manifold type may be used with the casting die of the multi-manifold type.

The composition of the solvent used in the present invention may be different between after or before concentrating the low concentration dope. For example, in order to peel the polymer film 91 formed of the high concentration dope 67, the poor solvent is used as the solvent. However, the poor solvent can dissolve the small amount of the solute. Accordingly, a mixture of the poor solvent and good solvent is preferably used as the solvent in order to prepare the low concentration polymer solution 30. Accordingly, it is preferable that the good solvent is more evaporated than the poor solvent in the flash evaporation, and that the poor solvent has high boiling temperature. The poor solvent of the polymer is, for example, n-butanol, methanol and the like. Accordingly, it is preferable that the content of the poor solvent is small in the low concentration dope and becomes larger in concentrating thereof. When the flash evaporation is performed in this case, the poor solvent having higher boiling point is evaporated less than other solvents having lower boiling points.

Further, it is preferable that the mixture solvent contains the poor solvents and good solvents. When the low concentration dope is prepared, the composition of the good solvent in the mixture solvent is large so as to dissolve the solute in short time. Further, when the polymer is used as the solute, the poor solvent often cannot dissolute but swells the polymer. When such a mixture solution is used in the present invention, it is preferable that the good solvent has low boiling point. In this case, the good solvent is evaporated in flash evaporation, and the content of the poor solvent becomes larger. When such a high concentration dope is cast in the film production line 80 of FIG. 4, the swollen polymer in the high concentration dope forms a gel-like film on the band 88. Accordingly, the time becomes shorter until the polymer film having self-supporting property is formed.

Note that the high concentration dope 67 is used for forming a middle layer of the polymer film in the above embodiment. However, the present invention is not restricted in it, and the high concentrated dope 67 may be used for forming an outer layer of the polymer film. For example, in FIG. 5, the positions of the concentrated dope 67 and the dope 106 may be exchanged, or the dope 106 may be the high concentration dope 67.

[Film and Product]

The formed polymer film 91 is cut to obtain five film samples having size of 5 cm$^2$. Each film sample, while being sandwiched between polarizes films in cross-nicol position, is observed to know whether there is a light point defect. When the criterion of the light point defect is satisfied, then it is determined that the polymer film has good characteristics and the low concentration dope is concentrated to the high concentration dope without generating the skinning in the tank main body 50 of the concentrating apparatus 44. The criterion is that the number of the light point defects having size of at least 20 μm is zero in 5 cm$^2$ on the film sample, that having size of at least 10 μm and less than 20 μm is ten, or that having size of at least 5 μm and less than 10 μm is ten.

The polymer film can be used as a protective film of a polarizing filter. When the protective films are adhered to both surfaces of a polarizer formed of polyvinyl alcohol, the polarizing filter is obtained. Further, when the polymer film is adhered to an optical compensation film, then an optical compensatory sheet is obtained as a product. Furthermore, when an antiglare layer is formed on the polymer film, then an optical functional film, for example antireflection film and the like is obtained as the product. These products can be used for a liquid crystal display.

[Experiment]

Experiments of Examples 1-2 and Comparison were performed, and the explanation thereof will be made. The explanations about Example 1 will be made in detail, and the same explanations about Example 2 and Comparison will be omitted.

EXAMPLE 1

The dissolution tank 13 in FIG. 1 was made of stainless and has a capacity of 400 L. In order to prepare the low concentration dope 30, materials described below were mixed and dispersed, and TAC powders (or flakes) were gradually added thereto such that total weight may be 400 Kg.

The materials for the low concentration dope is as follows:

| | |
|---|---|
| Cellulose triacetate | 17 pts. wt. |
| (acetyl value was 2.83, viscometric average degree of polymerization was 320, moisture content was 0.4% by mass, viscosity of 6% by mass of dichloromethane solution was 305 mPa · s. Averaged diameter of particle was 1.5 mm, the standard deviation is 0.5 mm) | |
| Dichloromethane | 63 pts. wt. |
| Methanol | 5 pts. wt. |
| Ethanol | 5 pts. wt. |
| 1-butanol | 5 pts. wt. |
| Plasticizer A (dipentaerythritholhexaacetate) | 1.2 pts. wt. |
| Plasticizer B (TPP) | 1.2 pts. wt. |
| UV-absorbing agent A (2,4-bis-(n-octylthio)-6-(4-hydroxy-3,5-di-tert-butylanylino)-1,3,5-triazine) | 0.2 pts. wt. |
| UV-absorbing agent B (2-(2'-hydroxy-3',5'-di-tert-butylphenyl)-5-chrolobenzotriazol) | 0.2 pts. wt. |
| UV-absorbing agent C (2-(2'-hydroxy-3',5'-di-tert-amilphenyl)-5-chrolobenzotriazol) | 0.2 pts. wt. |
| $C_{12}H_{25}OCH_2CH_2O$—P(=O)—$(OK)_2$ | 0.4 pts. wt. |
| Particles (silica having diameter of 20 nm, Mohs hardness was about 7) | 0.05 pts. wt. |

Note that the moisture content of each solvent (dichloromethane, ethanol, methanol, 1-butanol) is at most 0.2 wt. %.

The stirrer 19a and the eccentric stirrer 19b were respectively rotated at 15 m/sec of share rate ($5 \times 10^4$ kgf/m/sec$^2$ of share stress) and at 1 m/sec ($1 \times 10^4$ kgf/m/sec$^2$ of share stress) for 30 minutes. The temperature for starting dispersing the solutes was 20° C., and the temperature of the heat transfer medium was adjusted such that the temperature of the dispersion solution 20 at last might become 35° C. After the polymer was swollen, the eccentric stirrer 19b is stopped, and the stirrer was rotated at 0.5 m/sec for 100 minutes. Thus the dispersion solution 20 was obtained. Then the dispersion solution 20 is fed to the preparation tank 21, and thereafter through the analyzer 28 to the heater 29 by the pump 26, and the analyzer 28 (HR-800, produced by Yokogawa Electric Corporation) analyzed the composition of the dispersion solution 20. The polymer concentration was 17 wt. %. The heater 29 was a heat exchanger of multi-pipe type having a tube in which static mixers were provided, and heated the dispersion solution 20 to obtain the low concentration dope 30.

When the temperature of the low concentration dope 30 became to 80° C., the selector valve is set to feed the low concentration dope 30 to the concentrating apparatus 44. The temperature and the pressure of the low concentration dope 30 were controlled to 80° C. at the thermometer 42 and 1.1 MPa at the pressure gauge 41, respectively. Further, the low concentration dope 30 had the flow rate of 2.5 L/min. The viscosity of the low concentration dope 30 was 20 Pa·s (measured with a rotary viscometer) when the temperature of the low concentration dope 30 was 30° C. The dissolved gas content of the low concentration dope 30 was 150 mg/L at 30° C. and 101.3 kPa.

The tank main body 50 was formed of SUS 316. The capacity of the tank main body 50 was 7 L, the content of the concentrating dope 56 was usually 3 L and at most 5 L, and a size of the condensing surface 55a was 0.7 m$^2$. The controller 66a controlled the pump 66 to keep the height of the liquid surface 56a constant while the height of the solution surface 56a is detected by the sensor 65. Thereby 3 L of the concentrating dope was contained in the tank main body 50. The heat transfer medium 54c for the third jacket 53 was Nybrine Z1 (trade name, produced by Nisso Maruzen Chem. K.K.) having the temperature of 0° C. The temperature of an entrance in the third jacket 53 was 0° C., and that of an exit was 5° C. The flow rate of the heat transfer medium 54c was 10 L/min. The solvent gas 57a was condensed on the condensing surface 55a to become the condensed solvent 57b. The condensed solvent 57b in the gutter 58 flew downwards on the concentrating surface 55a, and was drawn through the pipe 60 to the recovery solvent tank 63.

The pressure of gas in the condensation roof 55 that was measured by the pressure gauge 59 was about 300 Pa lower than the atmospheric pressure while the absolute pressure of the gas in the tank main body was 1010 hPa. The height of the liquid surface 56a was controlled during the flash evaporation. The height of the dope surface 56a became constant with fluctuation in the range of −5 mm to +5 mm from a standard height. The heat transfer medium 54b for the second jacket 52 was water of 30° C. The pressure adjusting valve 43 was opened such that the flash pressure fluctuated in range of −0.1 MPa to +0.1 MPa from a standard flash pressure. The flow rates of the flow meters 27, 70 were controlled to be constant with fluctuation in range of −1% to +1% from the respective standard flow rates.

The polymer concentration of the polymer (or TAC) in the high concentration dope 67 that was measured by the analyzer 69 was 21 wt. %. Temperature of the high concentration dope 67 was of 38° C. The high concentration dope 67 had viscosity of 60 Pa·s at the temperature of 30° C. when a rotary viscosity meter was used. The flow rate of the high concentration dope 67 fed out from the concentrating apparatus 44 was 1.6 L/min. The boiling point of the high concentration dope 67 was 40° C. The dissolved gas content in the high concentration dope 67 was 20 mg/L at 30° C. and 101.3 kPa. The average residence time was 1.9 min. When the first filtration pressure P1 becomes 1.0 MPa, then the first amount V1 of the primary filtration apparatus was 1500 kg/m². When the second filtration pressure P2 becomes 2.0 MPa, then the second amount V2 was 1400 kg/m². The difference Rv of the filtration was 7%. Under these conditions, small amount of the skinning was generated.

(Producing Polymer Film)

The high concentration dope 67 was cast on the band 88 with the casting die 84 in the film production line 80 of FIG. 4. The band 88 was continuously fed at 3 m/min by rotating the rollers 86, 87 whose temperature was 20° C. The high concentration dope 67 was dried on the band 88 for three minutes to form the polymer film 91 having thickness of 80 µm, and the polymer film 91 was peeled from the peel roller 90. Then the polymer film 91 was dried in the tenter. Further, the polymer film 91 was sent to the drying chamber 93 in which the temperature was kept in the range of 100° C. to 150° C. Then, in the drying chamber 93, the polymer film 91 was fed for 10 minutes, and thereafter in the cooling chamber 95 to cool down to the room temperature. Then the polymer film 91 was wound by the winding apparatus 96.

Retardation $R_{th}$ of the polymer film 91 in the thickness direction was 15 nm. Therefore, the polymer film 91 has an excellent optical character. Note that the retardation $R_{th}$ was represented as follows:

$$R_{th}=\{(n_x+n_y)/2-n_z\} \times d \quad (2)$$

wherein d was an averaged thickness (nm) of the polymer film 91 and $n_x$, $n_y$ and $n_z$ were refractive index in a widthwise, feeding and thickness directions of the polymer film 91, respectively. These refractive indexes are measured with an Ellipson meter (polarization analyzer) while the ray of 632.0 nm was applied to the polymer film 91.

EXAMPLE 2

The dissolution tank 13 was made of stainless to have the capacity of 200 L. Further, a cold water was fed as the heat transfer medium in the jacket 17. In order to prepare the low concentration dope 30, materials described below were mixed and dispersed, and TAC powder (or flakes) were gradually added thereto such that total weight may be 200 Kg.

The materials for the low concentration dope is as follows:

| | |
|---|---|
| Cellulose triacetate | 15 pts. wt. |
| (acetyl value was 2.82, 6-substitution value of acetylate was 0.95, and 32% of total acetyl group made 6-substitution. Viscometric average degree of polymerization was 320, ratio of averaged molecular weight to number average molecular weight was 0.5, and distribution thereof was constant, moisture content was 0.2% by mass, viscosity of 6% by mass of dichloromet hane solution was 305 mPa · s. Averaged diameter of particle was 1.5 mm, standard deviation was 0.5 mm. Content of acetylic acid was at most 0.1 wt. %, that of Ca was 0.05 wt. %, that of Mg was 0.007% by mass, that of Fe was 5 ppm. Acetone extract was 22% by mass, haze was 0.08, transparency was 93.5%, Tg was 160° C., thermal energy for crystallization was 6.2 J/g.) | |
| Methylacetate | 58 pts. wt. |
| Acetone | 5 pts. wt. |
| Methanol | 6 pts. wt. |
| 1-butanol | 5 pts. wt. |
| Plasticizer (ditrimethylolpropane triacetate) | 1 pts. wt. |
| Plasticizer (TPP) | 1 pts. wt. |
| Plasticizer (biphenyl diphenyl phosphate) | 0.2 pts. wt. |
| Plasticizer (ethylphthalilglycol ethylester) | 0.2 pts. wt. |
| UV-absorbing agent A (2,4-bis-(n-octylthio)-6-(4-hydroxy-3,5-di-tert-butylanylino)-1,3,5-triazine) | 0.2 pts. wt. |
| UV-absorbing agent B (2-(2'-hydroxy-3',5'-di-tert-butylphenyl)-5-chrolobenzotriazol) | 0.2 pts. wt. |
| UV-absorbing agent C (2-(2'-hydroxy-3',5'-di-tert-amilphenyl)-5-chrolobenzotriazol) | 0.2 pts. wt. |
| Particles (silica having diameter of 20 nm, Mohs hardness was about 7) | 0.05 pts. wt. |
| Citric acid monoethylester | 0.04 pts. wt. |

Note that the moisture content of each solvent (methyl acetate, acetone, methanol, 1-butanol) is at most 0.2 wt. %.

At 25° C., the TAC started swelling, the concentration of oxygen was less than 10 vol. %. Other conditions were the same as in Example 1. Thereafter, the high speed stirring of the eccentric stirrer 19b was stopped, and the stirrer 19a stirred at 0.5 m/sec for 100 minutes. Thereby, the conditions for preventing explosion were kept.

Thus the dispersion solution 20 was obtained, and the moisture content thereof was 0.2 wt. %. The dispersion solution was supplied in a cooling-dissolving apparatus (not shown) in which a screw was provided. The screw was cooled by a cooling medium which is cooled by a cooler (not shown). Accordingly, in the cooling-dissolving apparatus, the dispersion solution was cooled for three minutes to dissolve the dispersions. Thereafter, the dispersion solution 20 was heated to have the temperature of 35° C. Then the dispersion solution 20 was supplied as the dope B in the preparation tank 21 which is made of stirring. Then, the dispersion solution 20 was stirred at 50° C. for two hours, and the filtration thereof was performed with use of a filter (trade name of #63, produced by Toyo Roshi Kaisha LTD., whose absolute filtration was 0.01 mm. Concentration of the TAC in the dispersion solution was 15 wt. %. Then the dispersion solution 20 was fed to the heater 29 of multi-tube heat exchanger to heat and obtain the low concentration dope 30.

When the temperature of the low concentration dope 30 became 120° C., then the flash evaporation of the low concentration dope 30 was performed in the concentrating apparatus 44. Thereby adjustments at the heater 29 and the pressure adjusting valve 43 were made so as to control the temperature and the pressure of the low concentration dope 30 for flash evaporation to 120° C. (measured ay the thermometer 42) and 1.6 MPa (measured by the pressure gauge 41). Further, the flow rate of the low concentration dope 30 was 2.0 L/min, the viscosity thereof was 15 Pa·s (measured at 30° C. by the rotary viscosity meter), and the dissolved gas content was 200 mg/L (measured at 30° C. and 101.3 kPa). Other condition of the low concentration dope 30 for flash evaporation was the same as in Example 1.

The pressure of gas in the condensation roof 55 that was measured by the pressure gauge 59 was about 300 Pa lower than the atmospheric pressure while the absolute pressure of the gas in the tank main body was 1010 hPa. The heat transfer medium 54b was fed for the second jacket 52 such that the temperature of the contact part to the concentrating dope 56 may be 40° C.

The polymer concentration of the high concentration dope 67 was 22 wt. %. Temperature of the high concentration dope 67 was of 58° C. The high concentration dope 67 had viscosity of 100 Pa·s at the temperature of 30° C. when a rotary viscosity meter was used. The boiling point of the high concentration dope 67 was 60° C. The dissolved gas content in the high concentration dope 67 was 25 mg/L at 30° C. and 101.3 kPa. The average residence time in the tank main body was 2.1 min. The flow rate of the high concentration dope 67 fed out from the concentrating apparatus 44 was 1.4 L/min. When the first filtration pressure P1 became 1.0 MPa, then the first amount V1 of the primary filtration apparatus was 1000 kg/m$^2$. When the second filtration pressure P2 became 2.0 MPa, then the second amount V2 of the secondary filtration apparatus 71 was 800 kg/m$^2$. The differential rate Rv of filtration was 20%. In under these conditions, small amount of the skinning was generated.

The high concentration dope 67 was used in the film production line 80 to form the polymer film 91 in the same method as in Example 1. Retardation $R_{th}$ of the polymer film 91 in the thickness direction was 20 nm. The polymer film 91 had excellent optical properties, although the main solvent of the high concentration dope 67 was methyl acetate which is not composed of chloride.

[Comparison]

In Comparison, the concentrating apparatus 140 of the prior art in FIG. 7 was used to perform flash evaporation of the low concentration dope 147. The capacity of the tank main body 141 was 200 L, and the total size of the condensing surface 141a was 1.0 m$^2$, the material thereof was SUS 316. Further, as the low concentration dope 147, the low concentration dope 30 in Example 1 was used. The temperature and the pressure for the flash evaporation were 80° C. and 1.1 MPa, respectively. The flow rate of the low concentration dope 147 for flash evaporation was 2.5 L/min.

The low concentration dope 147 had viscosity of 20 Pa·s at the temperature of 30° C. when a rotary viscosity meter was used. The dissolved gas content in the low concentration dope 147 was 150 mg/L. The polymer concentration of the low concentration dope 147 was 17 wt. %. After filtration with the filtration apparatus 152, flash evaporation of the low concentration dope 147 was made. The medium 143 of the jacket 142 had the temperature of 40° C., and the absolute pressure of the gas in the tank main body 141 was 1200 hPa.

The polymer concentration of the polymer (or TAC) in a high concentration dope 151 was 21 wt. %. The temperature of the high concentration dope 151 was 38° C. The high concentration dope 151 had viscosity of 60 Pa·s at the temperature of 30° C. when a rotary viscosity meter was used. The boiling point of the high concentration dope 151 was 40° C. The dissolved gas content in the high concentration dope 151 was 10 mg/L. The average residence time in the tank main body was 125 min. The flow rate of the high concentration dope 67 fed out from the concentrating apparatus 44 was 1.6 L/min. When the first filtration pressure P1 became 1.0 MPa, then the first amount V1 of the primary filtration apparatus was 1500 kg/m$^2$. When the second filtration pressure P2 became 2.0 MPa, then the second amount V2 of the secondary filtration apparatus was 700 kg/m$^2$. The differential rate Rv of filtration was 53%. In under these conditions, a large amount of the skinning was generated in the tank main body 141. After filtration with the secondary filtration apparatus, the polymer film was formed. Retardation $R_{th}$ of the polymer film 91 in the thickness direction was 16 nm.

[Producing Antireflection Film]

Antireflection films were produced from the polymer films of Examples 1, 2 and Comparison, and evaluation thereof were made.

(Preparation of Coating Solution a for Antiglare Layer)

In order to prepare a coating solution A for an antiglare layer, a mixture (DPHA, produced by NIPPON KAYAKU CO., LTD.) was used, in which dipentaerythlitol pentaacrylate and dipentaerythlitol hexaacrylate were mixed. The mixture of 125 g and bis(4-metacrylic thiophenyl) sulfide (MPSMA, produced by SUMITOMO SEIKA CHEMICALS CO., LTD.) of 125 g were dissolved in a mixture solvent of 439 g that contained methylethylketone of 50 wt. % and cyclohexanone of 50 wt. %. Thus a first solution was obtained. Further, second solution was prepared. In the second solution, a photoinitiator for radical polymerization (IRGACURE 907, produced by Ciba Geigy Japan Limited) of 5.0 g and photosensitizer (KAYACURE DETX, produced by NIPPON KAYAKU CO., LTD.) of 3.0 g were dissolved in methylethyl ketone of 49 g. The second solution was added to the first solution to obtain an added solution. For examination, the added solution was cast and thereafter solidified in ultraviolet ray to obtain a coating layer, which had refractive index of 1.60.

Further, crosslinked polystyrene particles (name of product: SX-200H, produced by Soken Chemical & Engineering Co., Ltd.) of 10 g, whose average particle diameter was 2 µm, were added to the added solution, and this mixture was stirred to disperse the crosslinked polystyrene particles with a high speed stirrer for an hour. The stirring speed thereof was 5000 rpm. Thereafter, the filtration of the dispersed solution was made with a polypropylene filter having holes whose pore diameter each was 30 µm. Then the coating solution A for antiglare layer was obtained.

(Preparation of Coating Solution B for Antiglare layer)

A mixture solvent containing cyclohexane of 104.1 g and methylethyl ketone 61.3 g was stirred by applying air bubble with an air mixer. Thereby a coating solution for hard coat (DeSolite KZ-7886A, produced by JSR corporation) of 217.0 g that contained zirconium oxide was added to the mixture solvent to obtain an added solution. The added solution was cast and thereafter solidified in ultraviolet ray to obtain a coating, which had refractive index of 1.61. Further, crosslinked polystyrene particles (name of product: SX-200H, produced by Soken Chemical & Engineering Co., Ltd.) of 5 g, whose average particle diameter was 2 µm, were added to the added solution, and this mixture was stirred to disperse the crosslinked polystyrene particles with a high speed stirrer for an hour. The stirring speed thereof was 5000 rpm. Thereafter, the filtration of the dispersed solution was made with a polypropylene filter having pores whose diameter each was 30 μm. Then the coating solution B for antiglare layer was obtained.

(Preparation of Coating Solution C for Antiglare Layer)

In order to prepare a coating solution C for an antiglare layer, Methylethyl ketone and cyclohexanone were mixed in ratio of 54 wt. % and 46 wt. % for using as the solvent. Further, a mixture (DPHA, produced by NIPPON KAYAKU CO., LTD.) was used, in which dipentaerythlitol pentaacrylate and dipentaerythlitol hexaacrylate were mixed. The solvent of 52 g was supplied with the mixture of 91 g, a solution for hard coat (DeSolite KZ-7115, produced by JSR corporation) of 19 g that contained zirconium oxide, and a solution for hard coat (DeSolite KZ-7161, produced by JSR corporation) of 19 g that contained zirconium oxide. Thus the mixture was dissolved to obtain a mixed solution. Then in the mixed solution was dissolved a photopolymerizable composition (IRGACURE 907, produced by Ciba Geigy Japan Limited) of log to obtain an added solution. The added solution was cast and thereafter solidified in ultraviolet ray to obtain a coating, which had refractive index of 1.61.

Further, crosslinked polystyrene particles (name of product: SX-200H, produced by Soken Chemical & Engineering Co., Ltd.) of 20 g, whose average particle diameter was 2 μm, were added to a mixture solvent of 80 g, in which methylethylketone of 54 wt. % and cyclohexanone of 46 wt. % were mixed. This solution was stirred to disperse the crosslinked polystyrene particles with high speed stirrer of 5000 rpm for an hour, and added to the added solution to obtain the dispersed solution. Thereafter, the filtration of the dispersed solution was made with a polyplopyrene filter having pores whose diameter each was 30 μm. Then the coating solution C for antiglare layer was obtained.

(Preparation of Coating Solution D for Hard Coating)

In order to prepare a coating solution D for a hard coating, Methylethylketone of 62 g and cyclohexanone of 88 g were mixed for using as the solvent. Then, ultraviolet curing hard coat composition (DeSolite KZ-7689, 72 wt. %, produced by JSR corporation) of 250 g was dissolved to the solvent. This obtained solution was cast and solidified in ultraviolet ray to form a coating, which had refractive index of 1.53. Further, the solution was filtrated with a polyplopyrene filter having pores whose diameter each was 30 μm. Then the coating solution D for hard coating was obtained.

(Preparation of Coating Solution E for Low Refractive Index Layer)

MEK-ST of 8 g (average diameter of particles was 10 nm-20 nm, $SiO_2$ sol dispersion of methylethylketone, whose solids content degree was 30 wt. %, produced by Nissan Chemical Industries Co., Ltd.) and methylethylketone of 100 g were added to heat closslinked polymer (TN-049, produced by JSR Corporation) of 20093 g containing fluoride that had refractive index of 1.42. This mixture was stirred and filtrated with a polypropylene filter having pores whose diameter was 1 μm. Thus the coating solution for low refractive index layer was obtained.

A surface of the Sample Film 1 having thickness of 80 μm was coated with the coating solution D by using a bar coater, and thereafter dried at 120° C. Then an ultraviolet ray was applied to the coating layer on the film with air-cooled metal halide lamp of 160 W/cm (produced by Eyegraphics Co., Ltd.). The illuminance was thereby 400 mW/cm$^2$, and illumination density was 300 mJ/cm$^2$. Thus the dope of the coating layer was solidified to form the hard coat layer of thickness of 2.5 μm on the film. Further, the coating solution A was applied on the hard coat layer on the film with the bar coater. The coating solution A was dried and solidified in the same conditions as in forming the hard coat layer. Thus the antiglare layer of 1.5 μm was formed. Furthermore, the antiglare layer was coated with the coating solution E for the low refractive index layer, and thereafter the coating solution E was dried at 80° C. Then the cross-linking was performed at 120° C. for ten minutes and to form a low refractive index layer whose thickness was 0.096 μm.

(1) Specular Reflectance and Integral Reflectance

A spectrophotometer V-550 (produced by JASCO Corporation) was provided with an adapter ARV-474 to measure the specular reflectance at an exiting angle of −5° according to the incident light of wavelength in the range of 380 nm to 780 nm at the incident angle of 5°. Then the average of the specular reflectance of the reflection whose wave length was in the range of 450 nm to 650 nm was calculated to evaluate properties of reflection inhibit.

Further, a spectrophotometer V-550 (produced by JASCO Corporation) was provided with an adapter ILV-471 to measure the specular reflectance according to the incident light of wavelength in the range of 380 nm to 780 nm at the incident angle of 5°. Then the average of the specular reflectance of the reflection whose wave length was in the range of 450 nm to 650 nm was calculated to evaluate antireflection properties.

(2) Haze

A haze meter MODEL 1001 DP, (produced by Nippon Denshoku Industries Co., Ltd.) was used for measurement of haze of the antireflection film. When the Haze is at most 15%, there is no problem in practice.

(3) Pencil Hardness

The evaluations of pencil hardness was made as described in JIS K 5400 and the data thereof was used as a criterion of scratch resistance. After the antireflection film was set in atmosphere with the temperature of 25° C. and the humidity of 60% RH for two hours, the surface of the antireflection film was scratched five times with a 3H test pencil determined in JIS S 6006. Thereby a force of 1 kg was applied to the test pencil. The evaluation of the pencil hardness was:

"E" (Excellent), when no scratch remains on the surface;

"G" (Good), when one or two scratches remained on the surface;

"R" (Reject), when at least three scratches remained on the surface.

(4) Contact Angle

After the antireflection film was set in the atmosphere with the temperature of 25° C. and the humidity of 60% RH for two hours, the contact angle of the water on the antireflection film was measured, and the data thereof was used as a criterion of antistaining, especially indicator of finger print. When the contact angle was from 90° to 180°, then there was no problem in practice.

(5) Color Tint

A CIE standard light source D65 illuminated the antireflection film. When the light from the CIE standard light source D65 incident at 5° to the antireflection film reflected on the surface thereof to be a regular reflection. According to the regular reflection were calculated L* number, a* number and b* number in a CIE 1976 L*a*b* space on the base of data of spectrum of the reflection which was observed in measuring the specular reflectance. The L* number, a* number and b* number represents the color tint of the regular reflection. When the L* number, a* number and b* number were respectively from 0 to +15, from 0 to +20, and from −30 to 0, then there was no problem in practice.

(6) Coefficient of Dynamic Friction

After the antireflection film was set in the atmosphere with the temperature of 25° C. and the relative humidity of 60% for two hours, the coefficient of dynamic friction was measured with a machine for measuring the coefficient of dynamic friction, HEIDON-14, in which a stainless ball of φ5 mm was used. Thereby, the speed was set to 60 cm/min, and a force of 100 g was applied on the surface of the antireflection film. When the coefficient of dynamic friction was at most 0.15, then there was no problem in practice.

(7) Antiglare Property

An fluorescent light (8000 cd/m²) without louver emitted a light onto the antireflection film and the light reflects. It is examined whether an image of the illumination lamp formed by the reflection was observed. The estimation of antiglare property was:
 "E" (Excellent), when no outline of the illumination lamp was observed;
 "G" (Good), when the outline was slightly recognized;
 "P" (Pass), when the outline was not clear but recognized;
 "R" (Reject), when the outline was almost clear.

(8) Situation of Surface of Antireflection Film

The surfaces of the antireflection films were observed with eyes. The estimation of the surfaces was:
 "E" (Excellent), when the surface was smooth;
 "G" (Good), when the surface was smooth, or when slight impurities were sometimes observed on the surface;
 "P" (Pass), when slight retractions and protrusions were often observed on the surface, and impurities were clearly observed;
 "R" (Reject), when retractions and protrusions were observed on the surface, and the many impurities were observed.

The coating solution B was used for coating the Sample Film 2 instead of the coating solution A, and other conditions were the same to form the antireflection film. Further, the coating solution C was used for coating the Sample Film 3 instead of the coating solution A, and other conditions were the same to form the antireflection film. Furthermore, according to Sample Film 2, three types of the antireflection films were made, in which the coating solution A, B, C were respectively used, and other conditions were the same to form the antireflection film.

TABLE 1

| Kind of Sample | SA | SR (%) | IR (%) | H (%) | PH | CA | Color Tint L*/a*/b* | DF | AP |
|---|---|---|---|---|---|---|---|---|---|
| Example 1 | A | 1.1 | 2.0 | 8 | E | 103° | 10/1.9/1.3 | 0.08 | E |
| | B | 1.1 | 2.0 | 8 | E | 103° | 9/2.0/−4.0 | 0.08 | E |
| | C | 1.1 | 2.0 | 12 | E | 103° | 9/1.7/0.2 | 0.08 | E |
| Example 2 | A | 1.2 | 2.2 | 8 | E | 103° | 10/2.0/1.3 | 0.09 | E |
| | B | 1.1 | 2.0 | 8 | E | 102° | 9/2.0/1.3 | 0.08 | E |
| | C | 1.0 | 1.9 | 10 | E | 105° | 10/1.8/1.2 | 0.06 | E |

SA: Kind of solution for antiglare layer
SR: Specular Reflectance
IR: Integral Reflectance
H: Haze
PH: Pencil Hardness
CA: Contact Angle
DF: Coefficient of Dynamic Friction
AP: Antiglare Property All of the six types of the antireflection films were excellent in physical properties of the antireflection film, such as antiglare properties, color tint, pencil hardness, fingerprinting stain proofness, and coefficient of dynamic friction.

[Producing of Polarizing Filter and Estimation Thereof]

Iodine had been absorbed to a poly vinyl alcohol film to obtain a polarizer. Sample Film 1 and Sample Film 2 were adhered with a polyvinyl alcohol based adhesive agent to both surfaces of the polarizer to obtain a sample filter. The sample filter was settled under condition of the temperature at 60° C. and atmosphere of 90% RH for 500 hours.

The parallel transmittance Yp and the direct transmittance Yc in a visible area were measured with a spectrophotometer. Thereafter, a polarization degree P was calculated from the following formula:

$$P=[(Yp-Yc)/(Yp+Yc)]^{1/2}\times100(\%)$$

The polarization degrees of Sample Film 1 and Sample Film 2 were at least 99.6%. The polarizing filter had the enough endurance. Accordingly, the polymer film formed from the high concentration dope obtained in the method for concentrating dope is preferably used as the protective film for the polarizing filter, and the polarizing filter has excellent optical properties.

The polarizing filter was provided in a liquid crystal display such that the protective film may be positioned in a front surface of a liquid crystal display. In the liquid crystal display, the light reflection was prevented on the liquid crystal display. Further, the outline of reflected images of the fluorescent lamp were not remarkable, and the displayed images were clearly perceived. The fingerprint was hardly formed on the liquid crystal display.

Various changes and modifications are possible in the present invention and may be understood to be within the present invention.

What is claimed is:

1. A concentrating tank for concentrating a polymer solution in which a solute is dissolved in a solvent, comprising;
 a tank main body for temporarily containing said polymer solution which is concentrated;
 means for evaporating a solvent gas from said polymer solution;
 a roof disposed on said tank main body, an inclined inner surface of said roof forming a condensing surface for condensing the solvent gas evaporated from said polymer solution;
 at least one flash nozzle inserted into said tank main body, said at least one flash nozzle being disposed under a solution surface of said polymer solution in said tank main body, for discharging a supplied fresh polymer solution into said polymer solution which is concentrated in said tank main body, said nozzle being for performing a flash evaporation of said polymer solution in said tank main body; and
 a draining pipe connected to a bottom of said tank main body for draining a concentrated polymer solution.

2. A concentrating tank described in claim 1, wherein an end of said at least one nozzle is bent to have an L-shape towards said bottom of said tank main body, said roof has a conical shape, and said tank main body has a bowl shape.

3. A concentrating tank described in claim 2, further comprising, at a lower end of said roof, a gutter for receiving and recovering a condensed solvent flowing downwards on said condensing surface.

* * * * *